United States Patent
Bol et al.

(10) Patent No.: US 9,409,102 B2
(45) Date of Patent: *Aug. 9, 2016

(54) ISOLATION OF SINGLE-WALLED CARBON NANOTUBES FROM DOUBLE AND MULTI-WALLED CARBON NANOTUBES

(71) Applicant: GLOBALFOUNDRIES INC., Grand Cayman (KY)

(72) Inventors: Ageeth A. Bol, Nuenen (NL); George S. Tulevski, Yorktown Heights, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 471 days.

This patent is subject to a terminal disclaimer.

(21) Appl. No.: 13/914,011

(22) Filed: Jun. 10, 2013

(65) Prior Publication Data
US 2013/0274083 A1    Oct. 17, 2013

Related U.S. Application Data

(63) Continuation of application No. 12/636,426, filed on Dec. 11, 2009, now Pat. No. 8,465,647.

(51) Int. Cl.
*B01D 17/02* (2006.01)
*B01D 21/26* (2006.01)
(Continued)

(52) U.S. Cl.
CPC .......... *B01D 21/262* (2013.01); *B01D 17/0217* (2013.01); *B82Y 30/00* (2013.01);
(Continued)

(58) Field of Classification Search
CPC .. B01D 17/0217; B01D 21/26; B01D 21/262; C01B 31/022; C01B 31/0226; C01B 31/026; C01B 31/0266; C01B 2202/02; B04B 5/00; B04B 5/0042; B82Y 30/00; B82Y 40/00
USPC ......... 210/511, 512.1, 634, 787, 789; 494/23, 494/27, 35, 37, 43, 15–19; 423/445 B, 460, 423/461; 977/742, 751, 752, 842, 845
See application file for complete search history.

(56) References Cited

U.S. PATENT DOCUMENTS 3,850,368 A    11/1974 Boeckeler
4,824,560 A    4/1989 Alspector
(Continued)

FOREIGN PATENT DOCUMENTS

JP    2006-265035    3/2005

OTHER PUBLICATIONS

Hennrich et al., "Improving separation techniques for single-walled carbon nanotubes: Towards mono disperse samples", phys. stat. so. (b) 245, No. 10, 1951-1953 (2008) / DOI 10.1002/pssb.200879555.
(Continued)

*Primary Examiner* — Joseph Drodge
(74) *Attorney, Agent, or Firm* — Scully Scott Murphy and Presser

(57) ABSTRACT

A method and system are disclosed for separating single-walled carbon nanotubes from double and multi-walled carbon nanotubes by using the difference in the buoyant density of Single-Walled versus Multi-Walled carbon nanotubes. In one embodiment, the method comprises providing a vessel with first and second solutions. The first solution comprises a quantity of carbon nanotubes, including single-walled carbon nanotubes and double and multi-walled carbon nanotubes. The single walled nanotubes have a first density, the double and multi-walled nanotubes having a second density. The second solution in the vessel has a third density between said first and second densities. The vessel is centrifuged to faun first and second layers in the vessel, with the second solution between said first and second layers. The single-walled carbon nanotubes are predominantly in the first layer, and the second and multi-walled carbon nanotubes are predominantly in the second layer.

6 Claims, 1 Drawing Sheet

(51) Int. Cl.
  *C01B 31/02*  (2006.01)
  *B82Y 30/00*  (2011.01)
  *B82Y 40/00*  (2011.01)

(52) U.S. Cl.
  CPC .............. *B82Y 40/00* (2013.01); *C01B 31/026* (2013.01); *C01B 31/0266* (2013.01); *C01B 2202/02* (2013.01); *Y10S 977/845* (2013.01)

(56) References Cited

U.S. PATENT DOCUMENTS

| | | |
|---|---|---|
| 6,896,864 B2 | 5/2005 | Clark |
| 7,074,310 B2 | 7/2006 | Smalley et al. |
| 7,357,906 B2 | 4/2008 | Colbert et al. |
| 7,361,430 B1 | 4/2008 | Gennett et al. |
| 7,662,298 B2 | 2/2010 | Hersam et al. |
| 8,153,014 B2 | 4/2012 | Doorn et al. |
| 8,193,430 B2 | 6/2012 | Papadimitrakopoulos et al. |
| 8,568,685 B2 * | 10/2013 | Strano et al. ................ 423/447.1 |
| 2004/0232073 A1 | 11/2004 | Papadimitrakopoulos et al. |
| 2006/0240238 A1 | 10/2006 | Boussaad et al. |
| 2008/0038183 A1 | 2/2008 | Nakata |
| 2008/0213159 A1 * | 9/2008 | Sandhu ...................... 423/447.1 |
| 2008/0220181 A1 * | 9/2008 | Babu ....................... B05D 7/22 427/551 |
| 2008/0290007 A1 | 11/2008 | Fagan et al. |
| 2009/0252946 A1 * | 10/2009 | Marsh et al. ............... 428/304.4 |
| 2010/0072458 A1 * | 3/2010 | Green ..................... B03D 3/00 257/24 |
| 2010/0105880 A1 | 4/2010 | Sooter |
| 2010/0326891 A1 | 12/2010 | Wang et al. |
| 2011/0042618 A1 | 2/2011 | Strano et al. |
| 2011/0174701 A1 | 7/2011 | Gallaway et al. |
| 2012/0042806 A1 * | 2/2012 | Hersam et al. ................ 106/814 |

OTHER PUBLICATIONS

Green et al., "Processing and properties of highly enriched double-wall carbon nanotubes", Nature Nanotechnology, vol. 4, Jan. 2009, www.nature.com/naturenanotechnology, 2009, pp. 64-70.

Maeda et al., "Large-Scale Separation of Metallic and Semiconducting Single-Walled Carbon Nanotubes", J. Am Chem. Soc. 2005, 127, 10287-10290.

Yu et al., "Separation of Mixed SWNTs and MWNTs by Centrifugal Force—an Experimental Study", Proceedings of the 7th IEEE, International Conference on Nanotechnology, Aug. 2-5, 2007, Hong Kong.

Maeda et al., "Simple purification and selective enrichment of metallic SWCNTs produced using the arc-discharge method", ScienceDirect, vol. 46, Issue 12, Oct. 2008, pp. 1563-1569.

Yanagi et al., "Separations of Metallic and Semiconducting Carbon Nanotubes by Using Sucrose as a Gradient Medium", The Journal of Physical Chemistry, vol. 112, Issue 48, Dec. 4, 2008, pp. 18889-18894.

* cited by examiner

ISOLATED SWCNTs

"WASTE", BOTTOM FRACTION

ISOLATION OF SINGLE-WALLED CARBON NANOTUBES FROM DOUBLE AND MULTI-WALLED CARBON NANOTUBES

CROSS REFERENCE TO RELATED APPLICATION

This application is a continuation application of co-pending U.S. patent application Ser. No. 12/636,426, filed Dec. 11, 2009, the entire content and disclosure of which is hereby incorporated herein by reference.

BACKGROUND OF THE INVENTION

1. Field of the Invention

The present invention generally relates to methods and systems for processing carbon nanotubes, and more specifically, to isolating single-walled carbon nanotubes from double and multi-walled carbon nanotubes.

2. Background Art

Single-Walled Carbon Nanotubes (SWCNTs), commonly known as "buckytubes," have attracted enormous interest due to their excellent electrical, optical and mechanical properties. SWCNTs are hollow tubular fullerene molecules consisting essentially of $sp^2$-hybridized carbon atoms typically arranged in hexagons. Single-wall carbon nanotubes typically have diameters in the range of about 0.5 nanometers (nm) and about 3.5 nm, and lengths usually greater than about 50 nm.

A key technological challenge is growing high-quality SWCNTs in large quantities. Although Chemical Vapor Deposition (CVD) provides the highest quality SWCNTs, large quantity forest growth is hampered by the presence of Double and Multi-Walled CNTs. The ratio of Single-Walled to Multi-Walled CNTs can vary greatly from one process to another and is difficult to control.

Several methods of synthesizing fullerenes have developed from the condensation of vaporized carbon at high temperature. Fullerenes, such as $C_{60}$ and $C_{70}$, may be prepared by carbon arc methods using vaporized carbon at high temperature. Carbon nanotubes have also been produced as one of the deposits on the cathode in carbon arc processes.

Single-wall carbon nanotubes have been made in a DC arc discharge apparatus by simultaneously evaporating carbon and a small percentage of Group VIIIb transition metal from the anode of the arc discharge apparatus. These techniques allow production of only a low yield of carbon nanotubes, and the population of carbon nanotubes exhibits significant variations in structure and size.

Another method of producing single-wall carbon nanotubes involves laser vaporization of a graphite substrate doped with transition metal atoms (such as nickel, cobalt, or a mixture thereof) to produce single-wall carbon nanotubes. The single-wall carbon nanotubes produced by this method tend to be formed in clusters, termed "ropes," of about 10 to about 1000 single-wall carbon nanotubes in parallel alignment, held by van der Waals forces in a closely packed triangular lattice. Nanotubes produced by this method vary in structure, although certain structures may predominate. Although the laser vaporization process produce can produce improved yields of single-wall carbon nanotubes, the product is still heterogeneous, and the nanotubes tend to be too tangled for many potential uses of these materials.

Another way to synthesize carbon nanotubes is by catalytic decomposition of a carbon-containing gas by nanometer-scale metal particles supported on a substrate. The carbon feedstock molecules dissociate on the metal particle surface and the resulting carbon atoms combine to form nanotubes. The method typically produces imperfect multi-walled carbon nanotubes. One example of this method involves the disproportionation of CO to form single-wall carbon nanotubes and $CO_2$ catalyzed by transition metal catalyst particles comprising Mo, Fe, Ni, Co, or mixtures thereof residing on a support, such as alumina. Although the method can use inexpensive feedstocks and moderate temperatures, the yield of single-wall carbon nanotubes can be low, with large amounts of other forms of carbon, such as amorphous carbon and multi-wall carbon nanotubes present in the product. The method often results in tangled carbon nanotubes and also requires the removal of the support material for many applications.

All-gas phase processes can be used to form single-wall carbon nanotubes. In one example of an all gas-phase process, single-wall carbon nanotubes are synthesized using benzene as the carbon-containing feedstock and ferrocene as the transition metal catalyst precursor. By controlling the partial pressures of benzene and ferrocene and by adding thiophene as a catalyst promoter, single-wall carbon nanotubes can be produced. However, this method suffers from simultaneous production of multi-wall carbon nanotubes, amorphous carbon, and other products of hydrocarbon pyrolysis under the high temperature conditions necessary to produce high quality single-wall carbon nanotubes.

BRIEF SUMMARY

Embodiments of the invention provide a method and system for separating single-walled carbon nanotubes from double and multi-walled carbon nanotubes. In one embodiment, the method comprises providing a vessel with first and second solutions. The first solution comprises a quantity of carbon nanotubes, including single-walled carbon nanotubes having a first density, and double and multi-walled carbon nanotubes having a second density. The second solution has a third density between said first and second densities.

The vessel is centrifuged to form first and second layers in the vessel, with the second solution between said first and second layers, wherein the single-walled carbon nanotubes are predominantly in the first layer, and the second and multi-walled carbon nanotubes are predominantly in the second layer. After the centrifuging, at least some of the first layer may be removed from the vessel to remove at least some of the single-walled carbon nanotubes from the vessel.

In an embodiment, the providing includes depositing the quantity of carbon nanotubes in the vessel. In one embodiment, the providing includes dispersing a starting material including said quantity of carbon nanotubes, in an aqueous solution with surfactant. In one embodiment, the providing includes depositing said starting material in the vessel above the second solution. In an embodiment, the first density is less than said third density, and in one embodiment, the first solution has a combined density less than said third density.

In an embodiment of the invention, separation of the SWCNTs from double and multi-walled carbon nanotubes is achieved by using the difference in the buoyant density of Single-Walled versus double and Multi-Walled CNTs. The starting material is dispersed in an aqueous solution containing surfactant. This solution is then added to a centrifuge tube, under which a higher density solution is layered. The centrifuge tube is centrifuged at high speeds causing the CNTs to sediment. The solution is tailored so that the buoyant density of the SWCNTs is in between the two solution densities causing the SWCNTs to sediment at the interface. The MWCNTs and large bundles have a higher buoyant density and thus sediment below the interface. The isolated SWCNTs can then be simply removed via pipette.

DETAILED DESCRIPTION

Figure 1:
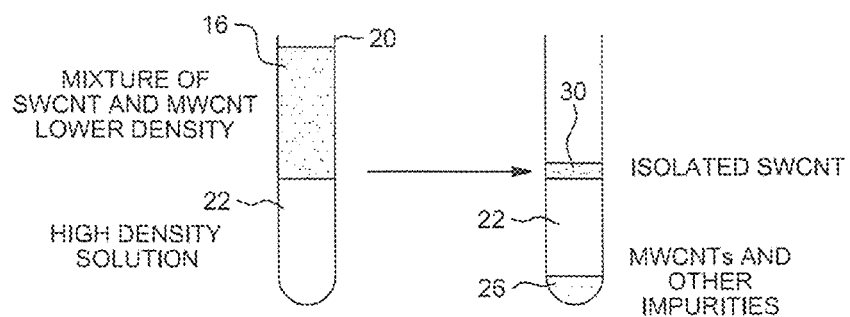
FIG. 1 schematically shows a system according to one embodiment of the invention.
Figure 2:
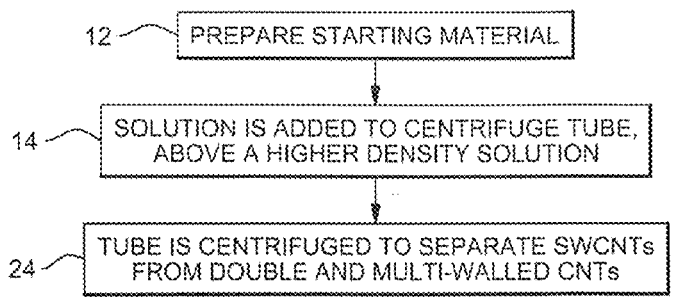
FIG. 2 illustrates a method embodying the present invention.

The present invention, generally, relates to methods and systems for isolating single-walled carbon nanotubes (SWCNTs) from double and multi-walled carbon nanotubes. With reference to FIGS. 1 and 2, in an embodiment, the invention uses the difference in the buoyant density of Single-Walled versus double and Multi-Walled CNT. At step 12, the starting material is dispersed in an aqueous solution containing surfactant. At step 14, this solution 16 is then added to a centrifuge tube 20, under which a higher density solution 22 is layered. The centrifuge tube 20 is centrifuged at step 24 at high speeds, causing the CNTs to sediment. The solution is tailored so that the buoyant density of the SWCNTs is in between the two solution densities, causing the SWCNTs to sediment at the interface. The MWCNTs and large bundles have a higher buoyant density and thus sediment, at 26, below the interface. The isolated SWCNTs, at 30, can then be simply removed via pipette.

Figure 2A:
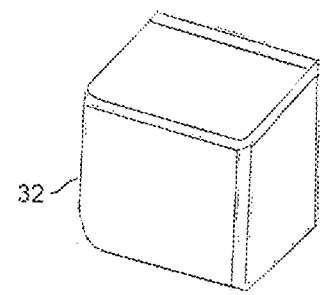
FIG. 2A illustrates a centrifuge.

In one embodiment, the CNT/surfactant solution 16 is prepared by first sonicating a substrate with the CVD grown CNTs in an aqueous solution of sodium cholate for one hour to disperse the CNTs in the solution. The solution is then added to a centrifuge tube 20 until the tube is filled approximately half-way. Below that, a solution 22 containing 30% w/v iodixanoll is layered resulting in a two layer solution in the centrifuge tube. The centrifuge tube is then centrifuged at 200,000 g for 15 hours to allow the CNTs to sediment at their respective positions 26, 30. The centrifuge tube is removed from the centrifuge and the fractions 26,30 are collected via pipette extraction. FIG. 2A shows a centrifuge 32.

Figure 3:
FIGS. 3 and 4 show TEM images of SWCNT and MWCNT fractions isolated in embodiments of the invention.
Figure 4:
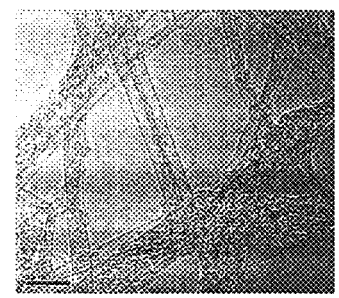

FIGS. 3 and 4 show TEM images of the isolated SWCNT fraction and the MWCNT fractions. As shown in the TEM images, the isolated fraction contains only SWCNTs while the "waste" fraction contains bundles and multi-walled SWCNTs. The images are representative of a number of images over various experiments that confirm the isolation of SWCNT's. Electrical measurements have also been performed on the isolated fraction and show that roughly ⅔ are semi-conducting; which is a hallmark of SWCNTs.

Carbon nanotubes (CNT) may be produced by a variety of methods, and additionally are commercially available. Methods of CNT synthesis include laser vaporization of graphite target arc discharge and HiPCo (high pressure carbon monoxide) process. Chemical vapor deposition (CVD) can also be used in producing carbon nanotubes. Additionally CNTs may be grown via catalytic processes both in solution and on solid substrates.

The solvent used for the nanotube dispersion can be any solvent that will dissolve the dispersant. The choice of solvent is not critical provided the solvent is not detrimental to the nanotubes or dispersant, and may be a mixture. For example, the solution may be water or aqueous based, optionally containing buffers, organic solvents, salts and/or chelators.

A wide array of surfactants, dispersal agents, and other additives may be used in embodiments of the invention. In an embodiment, a dispersant may be used to help disperse the carbon nanotubes in solution. A number of dispersants may be used for this purpose. The dispersant may be a polymer, and examples of polymers that could be suitable for the present invention include, but are not limited to, polyamines, nonionic polymers, anionic polymers, and cationic polymers. Bio-polymers may also be used as the dispersant. Suitable bio-polymers include, but are not limited to, peptides, proteins, nucleic acids and peptic nucleic acids.

Dispersion of the carbon nanotubes in a liquid can be greatly facilitated by subjecting the nanotubes in liquid to sonification for a sufficient period of time so that all, or at least a significant proportion of, the carbon nanotubes are individually dispersed.

Any suitable surfactant may be used in the practice of this invention. Surfactants can also be used as non-perturbing coatings for suspending individual single-wall carbon nanotubes. "Surfactants" are generally molecules having polar and non-polar ends and which commonly position at interfaces to lower the surface tension between immiscible chemical species. Surfactants can form micellular assemblies with the nanotubes in an appropriate solvent medium. In an aqueous system, the non-polar tail of the surfactant molecules will surround the nanotube, with the surfactant molecules radiating outward from the nanotubes like spokes on a wheel in a micellular-like fashion with the polar end groups on the outside of the micelle in contact with the aqueous media. Anionic, cationic or nonionic surfactants can be used in an appropriate solvent medium. Water is an example of an appropriate solvent medium.

Examples of anionic surfactants include, but are not limited to, N-lauroylsarcosine sodium salt, N-dodecanoyl-N-methylglycine sodium salt and sodium N-dodecanoyl-N-methylglycinate), polystyrene sulfonate (PSS), sodium dodecyl sulfate (SDS), sodium dodecyl sulfonate (SDSA), sodium alkyl allyl sulfosuccinate (TREM), sodium cholate (SC) and combinations thereof. Examples of cationic surfactants that can be used, include, but are not limited to, dodecyltrimethylammonium bromide (DTAB), cetyltrimethylammonium bromide (CTAB), cetyltrimethylammonium chloride (CTAC) and combinations thereof. Examples of nonionic surfactants include, but are not limited to, N-lauroylsarcosine or N-dodecanoyl-N-methylglycine, polyethylene glycol dodecyl ether, polyethylene glycol lauryl ether, polyethylene glycol hexadecyl ether, polyethylene glycol stearyl ether, and polyethylene glycol oleyl ether.

Various types of centrifuges can be used in embodiments of the invention; and for example, embodiments of the invention may use fixed angle centrifuges, swinging bucket centrifuges, or vertical or near vertical centrifuges. Selection of a centrifuge may depend on a variety of conditions, such as sample volume, number of sample components to be separated, particle size, desired run time, desired quality of separation and type of separation.

Selection of s suitable vessel for centrifuging also depends upon numerous factors such as, but not limited to, the centrifugation technique to be used, including the rotor in use, volume of sample to be centrifuged, need for sterilization, importance of band visibility, the nature of the sample and any solvent or gradient media, temperature and speed considerations, and whether the tubes or bottles are to be reused.

While it is apparent that the invention herein disclosed is well calculated to fulfill the objects discussed above, it will be appreciated that numerous modifications and embodiments may be devised by those skilled in the art, and it is intended that the appended claims cover all such modifications and embodiments as fall within the true spirit and scope of the present invention.

What is claimed is:

1. A method for processing carbon nanotubes to isolate single-walled carbon nanotubes from double and multi-walled carbon nanotubes, the method comprising:
    preparing a starting material including single-, double-, and multi-walled carbon nanotubes, the single-walled carbon nanotubes having a first density and the double and multi-walled carbon nanotubes together having second density;
    dispersing the starting material in a aqueous solution to form a first solution including said single, double- and multi-walled carbon nanotubes;
    depositing a second solution in a tube, said second solution having a third density between said first and second densities;
    depositing the first solution in the tube, above the second solution; and
    using differences between the first, second and third densities to isolate the single-walled carbon nanotubes from the double- and multi-walled carbon nanotubes in the tube, with the second solution between the single-walled carbon nanotubes and the double and multi-walled carbon nanotubes.

2. The method for processing carbon nanotubes according to claim 1, wherein the first solution has a combined density less than said third density.

3. The method for processing carbon nanotubes according to claim 2, wherein first density is less than said third density.

4. The method for processing carbon nanotubes according to claim 1, wherein the using differences between the first, second and third densities includes using said differences to sediment the single-walled carbon nanotubes above the double- and multiwalled carbon nanotubes.

5. The method for processing carbon nanotubes according to claim 1, wherein the second solution separates the sediment of the single-walled carbon nanotubes from the sediment of the double and multi-walled carbon nanotubes.

6. The method for processing carbon nanotubes according to claim 1, wherein the second density is between the first and second densities.

* * * * *